A. S. HARRIS.
SAW SETTING DEVICE.
APPLICATION FILED JUNE 6, 1911.
1,028,088.
Patented May 28, 1912.
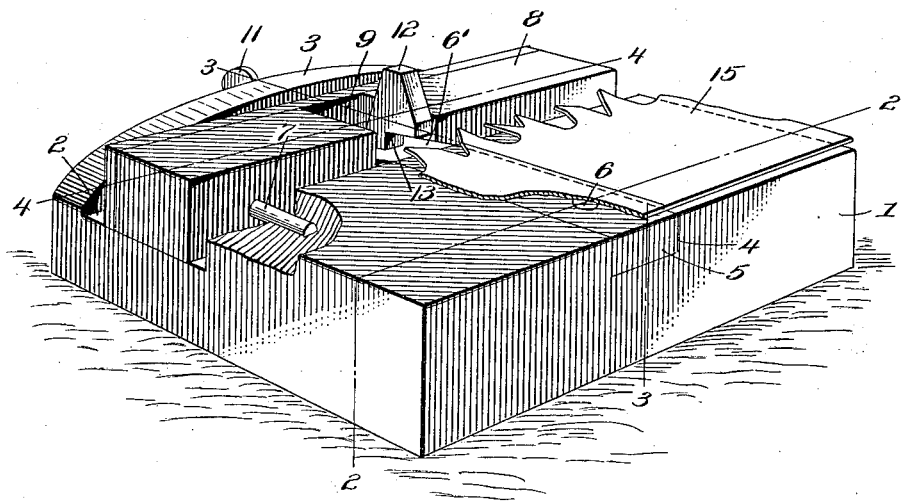
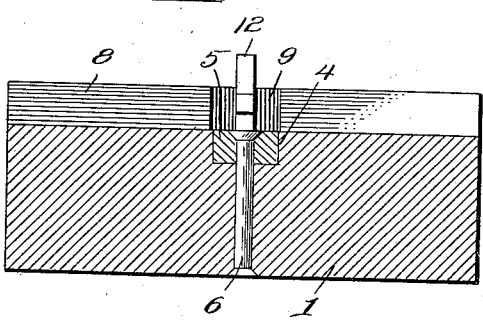
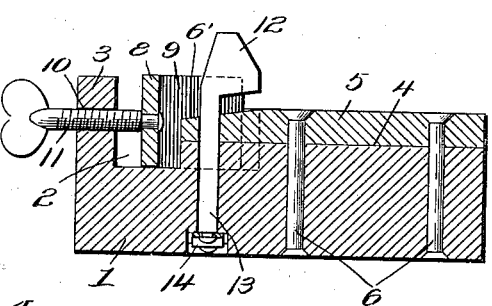
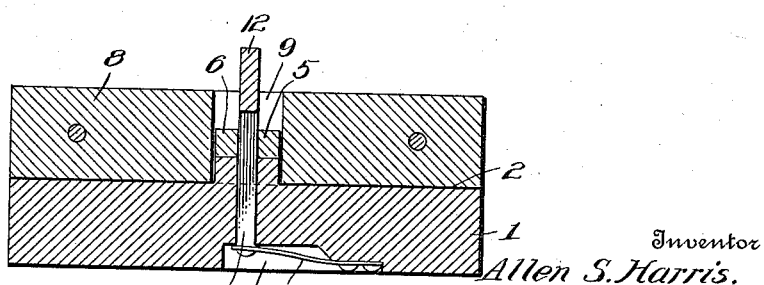
Inventor
Allen S. Harris.
Witnesses
By Victor J. Evans
Attorney

UNITED STATES PATENT OFFICE.

ALLEN STANLEY HARRIS, OF RICH HILL, OHIO.

SAW-SETTING DEVICE.

1,028,088.   Specification of Letters Patent.   Patented May 28, 1912.

Application filed June 6, 1911. Serial No. 631,521.

*To all whom it may concern:*

Be it known that I, ALLEN S. HARRIS, a citizen of the United States, residing at Rich Hill, in the county of Knox and State of Ohio, have invented new and useful Improvements in Saw-Setting Devices, of which the following is a specification.

This invention relates to saw setting devices for the purpose of setting the teeth of cross cut and other saws, and it has for its object to produce a device of this class which shall possess superior advantages in point of simplicity, durability and general efficiency, and by the use of which the teeth of a saw may be set with absolute accuracy without having recourse to skilled labor.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention; it being, however, understood that no limitation is necessarily made to the precise structural details therein exhibited, but that changes, alterations and modifications within the scope of the appended claims may be resorted to when desired.

In the drawing: Figure 1 is a perspective view of a device constructed in accordance with the invention, a portion of a saw blade being shown in position for operation. Fig. 2 is a longitudinal sectional view, taken on the line 2—2 in Fig 1. Fig. 3 is a vertical transverse sectional view, taken on the line 3—3 in Fig. 1. Fig. 4 is a sectional detail view taken on the line 4—4 in Fig. 1.

Corresponding parts in the several figures are denoted by like characters of reference.

The base 1 of the improved device is provided with a longitudinal groove or recess 2 adjacent to which an upstanding flange 3 is formed or secured. The base 1 which is adapted to support the saw that is to be operated upon has a transverse groove 4 in which the anvil block 5 is seated and firmly secured by fastening members 6, such as bolts or rivets. The anvil block which is made of hardened steel or other suitable material, is flush with the upper face of the base member 1, and is of a length equal to the width of the saw supporting portion of said base member, so as to afford a firm support for the saw; said anvil block has a beveled face portion 6 overhanging the groove or recess 2, the bevel of said face portion corresponding with the angle at which the saw teeth are to be set.

The base member 1 is connected with the flange 3 by means of guide rods 7 extending transversely of the groove or recess 2 at either side of the anvil block, said rods serving to guide a slidable gage member 8 which consists of a block of suitable material having a deep notch 9 to accommodate the beveled face portion of the anvil block. The upstanding flange 3 has a threaded aperture 10 for the reception of an adjusting screw 11, the inner end of which has swiveled connection with the guide member which latter may be moved or adjusted transversely of the groove or recess 2 by means of the said screw 11.

The beveled face portion of the anvil block is provided with a vertically movable punching member consisting of a head 12 having a shank 13 which is guided through apertures in the anvil block and the base, and which is projected in an upward direction by the action of a suitably arranged flat spring 14 which is seated in a recess 24 in the underside of the base. The head 12 of the punching member projects above the beveled face portion 6 of the anvil block, and the under face of said head portion is parallel to the beveled face portion 6. When the blade 15 of the cross cut or other saw is placed upon the base 1, it will likewise be firmly supported on the anvil block which extends over the entire width of the base and the saw teeth may be successively introduced between the beveled faces 6' and 12 of the anvil block and the punching member, respectively, and by striking the punching member sharp blows with a hammer, it may be actuated to set the teeth at the desired angle. It is obvious that the gage member 8 may be previously adjusted to be engaged by the points of the saw teeth, thereby serving to hold the saw blade true, while the teeth are being set. It is also evident that the face of the gage member may be either straight or curved according to the nature of the saw that is to be operated upon. The anvil block and the punching member may be mounted in such a manner as to be readily detached to enable others having opposed faces of different angles to be substituted when desired. By making the anvil block of a length equal to the width of the saw supporting portion of the base plate, said anvil block affords an extended support for the saw blade, and it is conveniently accessible when desired to substitute another anvil block in the place thereof. The punch being guided through apertures not only in the anvil block, but also in the base plate will be held perfectly true to its work.

Having thus described the invention, what is claimed is:

In a saw setting device, a saw supporting base member having a recess in the underside thereof and provided in its upper side with a longitudinal recess, an upstanding flange, and a transverse groove formed in and extending the entire width of the saw supporting portion of said base member, an anvil block seated in the transverse groove and having a beveled face portion extending into the longitudinal recess, a spring actuated punch member operating through the beveled face portion of the anvil block and having a beveled face portion opposed thereto, said punch member extending also through the base member and into the recess in the underside of said base member, a flat spring mounted in said recess and engaging the lower end of the punch member to force the latter in an upward direction, guide members connecting the base with the upstanding flange, a gage member movably supported upon the guide members, and an adjusting screw for the gage member operating through the upstanding flange.

In testimony whereof I affix my signature in presence of two witnesses.

ALLEN STANLEY HARRIS.

Witnesses:
 CHAS. D. HAYDEN,
 J. W. T. DAVIS.

---

Copies of this patent may be obtained for five cents each, by addressing the "Commissioner of Patents, Washington, D. C."